United States Patent [19]

Pryor

[11] Patent Number: 4,561,776

[45] Date of Patent: Dec. 31, 1985

[54] ELECTRO-OPTICAL SENSORS FOR TOOL AND ROBOTIC INSPECTION

[75] Inventor: Timothy R. Pryor, Tecumseh, Canada

[73] Assignee: Diffracto Ltd., Ontario, Canada

[21] Appl. No.: 247,399

[22] Filed: Mar. 25, 1981

[51] Int. Cl.[4] .................. G01N 21/47; G01B 11/24; G01B 11/30

[52] U.S. Cl. ..................................... 356/72; 356/241; 356/372; 356/375; 408/2; 408/116

[58] Field of Search ............... 356/241, 372, 72, 378, 356/69, 390–393, 256, 430, 375, 43–44, 28, 256; 250/227, 239; 408/2, 116, 7, 16; 350/52, 63, 582–590, 506, 96.10, 96.26; 33/195 R; 73/7

[56] References Cited

U.S. PATENT DOCUMENTS

| | | | |
|---|---|---|---|
| 2,267,186 | 12/1941 | Blood | 408/2 |
| 2,941,446 | 6/1960 | Senglet | 356/375 |
| 3,191,294 | 6/1965 | Daugherty | 408/2 |
| 3,221,593 | 12/1965 | Ferris | 356/241 |
| 3,516,723 | 6/1970 | Guier | 350/63 |
| 3,551,061 | 12/1970 | Glowa | 356/241 |
| 3,678,281 | 7/1972 | Gleixner | 250/239 |
| 3,733,138 | 5/1973 | Weinberg | 350/96.1 |
| 3,739,184 | 6/1973 | Katsumata et al. | 350/96.26 |
| 3,749,496 | 7/1973 | Hietanen et al. | 356/241 |
| 3,812,376 | 5/1974 | Takeyama et al. | 250/277 |
| 3,843,261 | 10/1974 | Pryor | 356/355 |
| 3,878,397 | 4/1975 | Robb et al. | 250/227 |
| 3,976,382 | 8/1976 | Westby | 356/376 |
| 4,014,656 | 3/1977 | Leibenzeder et al. | 356/44 |
| 4,055,382 | 10/1977 | Ziekman et al. | 356/241 |
| 4,082,946 | 4/1978 | Heine et al. | 350/96.26 |
| 4,109,998 | 8/1978 | Iverson | 250/578 |
| 4,158,508 | 6/1979 | Durant | 356/385 |
| 4,255,056 | 3/1981 | Peterson | 356/401 |
| 4,282,430 | 8/1981 | Hatten et al. | 250/239 |
| 4,305,661 | 12/1981 | Pryor et al. | 356/241 |
| 4,326,804 | 4/1982 | Mossey | 356/375 |
| 4,383,761 | 5/1983 | Jones | 350/96.1 |

FOREIGN PATENT DOCUMENTS

| | | | |
|---|---|---|---|
| 591558 | 1/1934 | Fed. Rep. of Germany | 350/506 |
| 1180538 | 10/1964 | Fed. Rep. of Germany | 356/69 |
| 2121744 | 11/1972 | Fed. Rep. of Germany | 356/236 |
| 2717412 | 10/1978 | Fed. Rep. of Germany | 356/73.1 |
| 476803 | 12/1937 | United Kingdom | 356/237 |
| 369447 | 8/1973 | U.S.S.R. | 356/138 |

OTHER PUBLICATIONS

Grove et al., "Real-Time Image Processing System for Automated Inspection of Drilled Holes" Proc. Soc. Photo–Opt. Instrum. Eng. (USA), SPIE vol. 241, 1980, pp. 85–95.

Pratt & Whitney, "Design, Fabrication & Demonstration of a Miniaturized Tip Clearance Measuring Device", USAA MRDL–TR–74–67, Final Rep. 7–1973 thru 4–1974, Pratt & Whitney Aircraft, Florida Res. & Dev. Center, West Palm Beach, Fla. 33402, pp. 10–13.

Elijah et al., "Temperature Sensing", IBM Tech. Disc. Bull. 8-1970, p. 758.

Karg et al., "Opto–Electronic Sensor for Industrial Robots" Feinwertechnik & Messtechnik 87, (1979), pp. 83–86.

Primary Examiner—William H. Punter
Attorney, Agent, or Firm—Larson and Taylor

[57] ABSTRACT

An electro-optical sensor probe is removably mounted on a conventional machine tool, for example, at a location whereat a tool would normally be mounted, for sensing the condition of a workpiece. Signals received by the sensor probe can be conveyed to a control location either by radio telemetry or across electrical and-/or fiber optic lines operationally coupled to the sensor probe. Alternatively, robot based positioning of said probes is disclosed.

30 Claims, 20 Drawing Figures

EDGE IMAGE, CONTACT 402/403 FOCUSED CONDITION, CONTACT 301 FULLY EXPANDED IN Z AXIS (NO CONTACT WITH PART)

EDGE IMAGE ON ARRAY 360 DEFOCUSED CONDITION, CONTACT 301 FULLY COMPRESSED IN Z AXIS DUE TO PART CONTACT

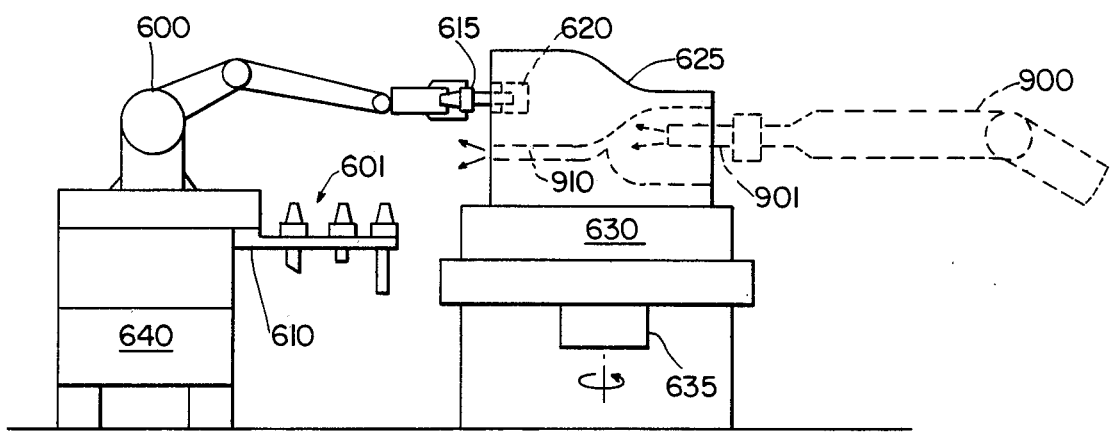
FIG. 4B
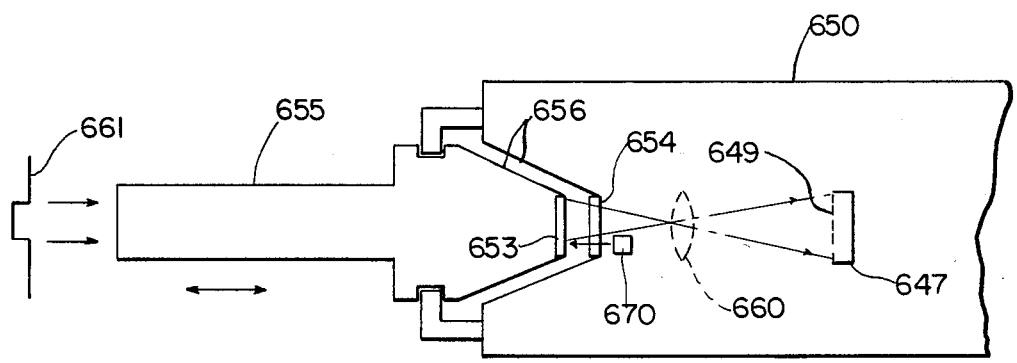
FIG. 4C
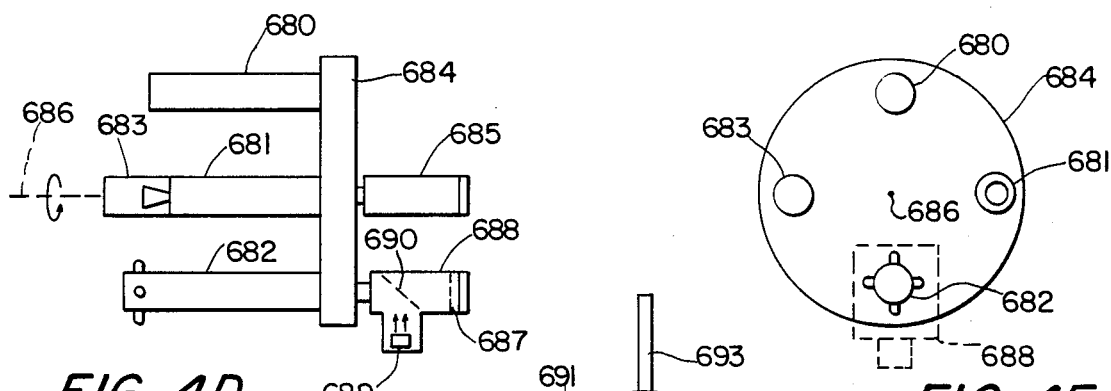
FIG. 4D
FIG. 4E
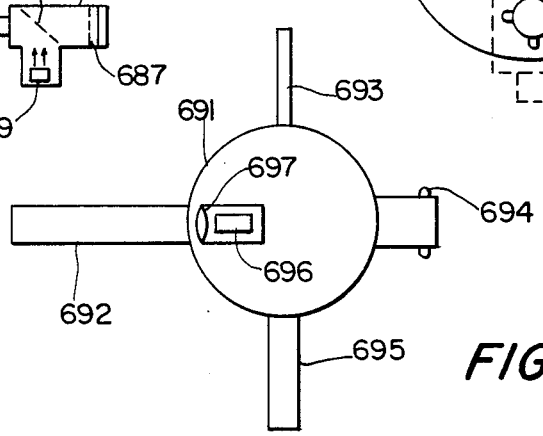
FIG. 4F

ELECTRO-OPTICAL SENSORS FOR TOOL AND ROBOTIC INSPECTION

BACKGROUND

This invention relates to the inspection of workpieces, and in particular it relates to inspection by electro-optical means.

After a workpiece, i.e. a part of an apparatus or device being manufactured has been worked upon by the tool of a machine tool such as a cutting machine, a milling machine, etc. it is necessary to inspect a condition of that machine to assure that the work was done accurately.

Commonly owned pending U.S. patent applications Ser. Nos.:

1. Electro-optical sensor systems for thread and hole inspection Ser. No. 64,867, now U.S. Pat. No. 4,315,688.
2. Method and apparatus for electro-optically determining the dimension, attitude and location of objects: Ser. No. 34,278 now U.S. Pat. No. 4,373,804.
3. Method and apparatus for determining physical characteristics of objects and object surfaces: Ser. No. 15,792 now U.S. Pat. No. 4,305,661.
4. New photodetector array based optical measurements systems: Ser. No. 163,290, filed June 26, 1980.
5. Electro-optical inspection: Ser. No. 73,226, now abandoned.
6. Co-ordinate measuring method and device: Ser. No. 207,081, filed Nov. 14, 1980.
7. Electro-optical surface roughness measurement and control: Ser. No. 240,459 filed Mar. 4, 1981.
8. Electro-optical sensors with fiber optic bundles: Ser. No. 173,370, filed July 29, 1980.
9. Apparatus for determining dimensions: Ser. No. 134,465, filed Mar. 20, 1980.
10. High speed electro-optical inspection: Ser. No. 203,866 filed Nov. 4, 1980.
11. Fiber optic based robot controls: Ser. No. 200,401, filed Oct. 24, 1980.

disclose useful, proven, electro-optical sensor units employing solid state photo detector arrays and other elements. The majority of such units sense the condition of the part without contacting the same by receiving light from the surface of the part onto a detector array comprised of a plurality of aligned light received diodes, usually scanned sequentially.

The sensor units described in said pending applications may have many different uses, for example: sensing threaded holes to ascertain the number of threads, the pitch, the depth, and the blind hold depth; the outer diameters and radii of parts; range and surface locations by triangulation; surface defects and flaws; surface roughness and optical bore gaging.

In accordance with the present state of the art the workpieces or parts are worked upon at one location and inspected at a subsequent location. This required the complexity and expense of separate work stations for tool working procedures and the inspection procedures.

SUMMARY OF THE INVENTION

According to the present invention, an electro-optical sensor probe of the type described is mounted directly on a machine tool, and preferably the very machine which is to perform an operation on the workpiece part. If the tool machine has only a single tool mounting coupling, then after it has finished working on the workpiece part, the tool can be replaced by a sensor probe. However, the present invention is preferably utilized in combination with a tool machine having a plurality of tool couplings so that the sensor probe can be mounted in a tool coupling other than the one carrying the tool which works on the workpiece part. In this manner, the main advantage of the present invention is achieved in that at a single work station, in the absence of additional mounting structures or additional floor space, one can accomplish both functions, i.e. working on the workpiece part with the tool, and then performing an electro-optic inspection of the workpiece part. The tool couplings are normally mounted on a spindle or head. Consequently, with the present invention, after the tool has completed its work on the workpiece part, the spindle or head can be manipulated, i.e. either lengthwise, widthwise or possible rotationally, to bring the sensor probe into the correct position to inspect the workpiece part.

While it is preferable to mount the sensor probe and the tool on the same tool machine and thereby eliminate floor space, advantageous results may also be achieved if the sensor probe is mounted on a separate tool machine located downstream (in the direction of movement of the workpiece part) from the tool machine which works on the workpiece part creating the condition to be inspected. In this situation, although additional floor space is required, the advantage is still achieved that the sensor probe is mounted on a second machine, perhaps already located in the work area, thereby eliminating the need for purchasing further mounting means for the sensor probe. Indeed, this further machine can be robotic in nature picking up different sensor probes and inspecting a part sequentially therewith.

A photodetector array based sensor, as described in the said pending applications comprises in essence an arrangement for directing a light against the surface of the workpiece part being inspected and then sensing the light transmitted past or reflected therefrom on a plurality of aligned detectors, usually photo diodes. The detectors are scanned to ascertain the electrical output, if any, existing in each detector.

In accordance with a first preferred embodiment of the present invention, the sensor probe may be so mounted on the tool machine that it is separated physically from all optic or electric lines. In this case light signals received at the diode array would be transmitted to a readout station through radio telemetry. In this case, the light source, the radio transmitter and a supply battery would be located in the sensor probe. With this embodiment, two possibilities exist. First, it is possible to transmit the raw detected light signal to the readout. Second, it is possible to extract the data desired from the light signal at the sensor probe and transmit only the answer.

In accordance with another preferred embodiment of the present invention, instead of using radio telemetry, the sensor probe may transmit its light and/or electrical signals through a specially designed mating part which is connectable through a suitable coupling onto a tool machine, preferably onto the spindle or head thereof. In this case neither the battery nor the light source need be located in the detector. Rather, the electrical energy can be supplied through lines passing through the mating part and similarly, the light to be reflected against the workpiece part can also be supplied through fiber optics passing through the mating part.

In either embodiment, a fluid flow line normally directed to bring a coolant fluid to a tool can be purged of coolant and used instead for bringing air into the sensor probe and through suitable nozzles at the end thereof for cleaning the workpiece part prior to the electro-optical sensing thereof.

Hence, it is an object of the present invention to provide a new and improved arrangement for simplifying and generalizing the use of a diode array sensor probe.

It is another object of the present invention to provide the combination of a diode array sensor probe with a tool machine wherein the former is mounted on the regular tool mounting parts of the latter.

It is a further object of the invention to provide means for coupling signals or images of a variety of sensor probes to external readouts via non contact fiber optic or other light transmitting couplings.

It is a still further object of the invention to provide for interchangeable sensor probes capable of economic robotic usage using interchangeable tooling and non-contact coupling and to provide a robotic machine for use therewith.

An additional object of the invention is to provide the requisite air blow-offs and other precautions required to keep said probes operational in the working environment.

These and other objects of the present invention will become apparent from the detailed description to follow, taken together with the accompanying drawings.

BRIEF DESCRIPTION OF THE DRAWINGS

There follows a detailed description of preferred embodiments of the present invention to be taken together with the accompanying drawings wherein:

FIG. 4B is a diagrammatic view of a system utilizing the device of FIG. 4A, FIG. 4C is a diagrammatic view of an alternative to the device of FIG. 4A, FIG. 4D is a diagrammatic side view of a sub-assembly useful in the device of FIG. 4B, FIG. 4E is a diagrammatic end view of the device of FIG. 4D, FIG. 4F is a diagrammatic view of an alternative to the sub-assembly of FIG. 4D, FIGS. 5A, 5B, and 5C are diagrammatic views of portions of the device of FIG. 5.

DETAILED DESCRIPTION OF THE PREFERRED EMBODIMENTS

Figure 1:
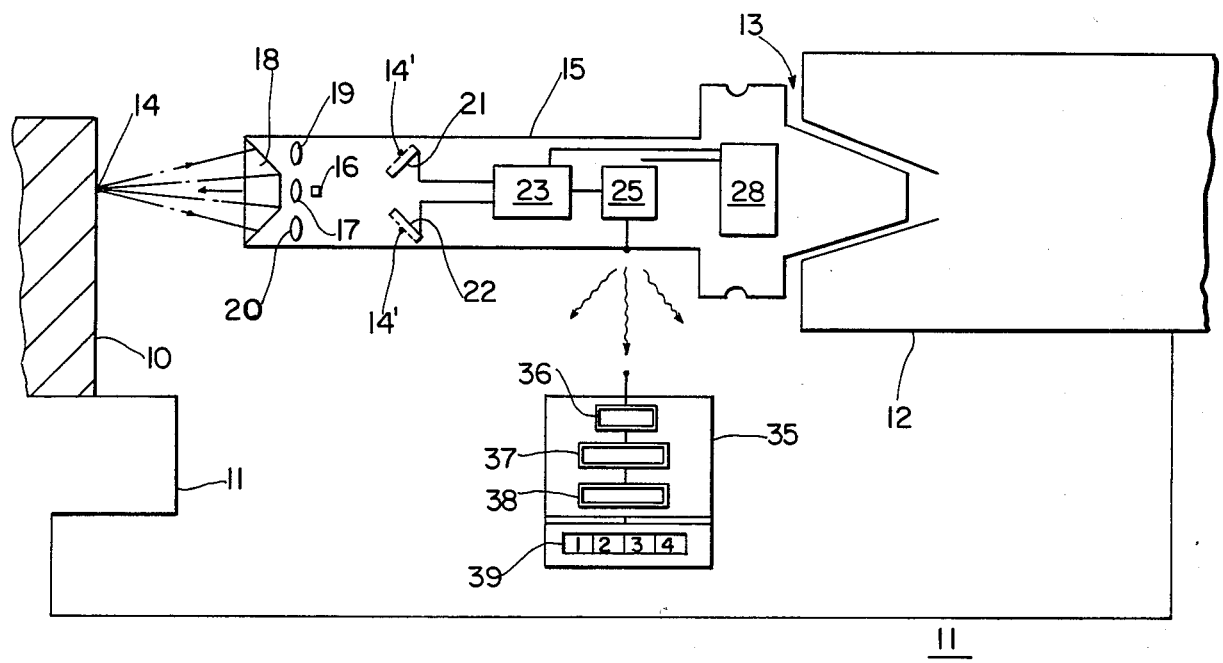
FIG. 1 is a diagrammatic drawing illustrating a first embodiment of the present invention.

FIG. 1 illustrates schematically a first embodiment of the present invention. In this embodiment, the workpiece part 10 is shown located on the machine base 11 where it has just been machined. Mounted on this same base 11 is the spindle or head of the tool machine, the spindle being capable of movement relative to the base at least towards and away from the workpiece part and vertically. Depending on the design of the tool machine, it may also include means for rotating the spindle or head 12 about a vertical axis. This embodiment includes a tool mounting coupling 13 of a type normally used for mounting a tool on the spindle or head 12. In this case, however, it is used for mounting a sensor probe 15 such that the probe can be manipulated to the precise position as required to inspect a feature in the surface of workpiece part 10. This feature may include for example a threaded hole, an outer diameter, a surface defect, etc. In any event, the sensor probe 15 is brought by the spindle or head 12 to the position near the workpiece part 10 where range data is to be taken from the face or faces thereof. It will be noted that the sensor probe in this embodiment is a miniaturized version of that shown in the said pending applications.

The possible movements of the spindle or head, as described above are essentially all of the movements that the machine normally permits. Rotation is not particularly necessary for all uses of the sensor probe. However, it is at least highly desirable in many situations.

Probe 15 includes a light source 16, preferably in the form of a semi-conducting diode laser with low power requirements to illuminate via lens 17 the workpiece part 10 producing spot 14 from which the reflected illumination is diverted via prism 18 and imaged by lenses 19 and 20 to form spots 14' onto the two photo detector arrays 21 and 22, each of which views spot 14 from a different and opposite angle. As described in one of said pending applications, the detector arrays, in this case photo diode arrays, are canted in this case to maintain focus over a larger range. As was also stated in one of the referenced co-pending applications, such systems have been capable of 0.00002 inch resolution with ranges of 0.040". Less resolution and a greater range is also possible.

The diode arrays 21 and 22 are scanned by a scanning circuit device 23 which is connected to an output radio telemetry transmitter 25. A battery 28 supplies power for the transmitter, for the diode laser illumination means and for the diode array scanning means. Since all of the elements of the illustrated system are solid state, the power and voltage requirements are kept low.

The signals from transmitter 25 are received by a readout device 35 which contains receiving electronics, represented diagramatically by 36, to receive the transmitted signal and amplify it. 37 represents a special signal enhancement and conditioning module. 38 represents readout electronics for arriving at the answer which in this case is the positions of the imaged spot from the surface on the diode arrays, and 39 represents a display and data interface module for this data.

It is to be noted that the diode array, being an all digital sensor operating at high frequency is a very good match for FM or PCM transmission. For this use, solid state low voltage and power light sources are also desirable, e.g. LEDs and diode lasers.

Linear or circular diode arrays have been used heretofore for measurement purposes. Typical arrays run from 256 elements long, operated at 1000-10,000 scans per second to a maximum 2048 elements long operating at a maximum of 1000 scan per second. In the case of a matrix array of 250×250 elements a typical scan is 30 scans per second of each of the 250 lines of the 250 elements. In any event, typical detector to detector rates are in the range of 0.1-5 MHz.

The embodiment of FIG. 1 can be used in one of two ways. First, the raw detected light signals can be transmitted at 0.1-5 MHz and processed remotely. Secondly, the data desired from the light signal can be extracted and processed in the sensor probe after which only the answer would be transmitted. While both of these possibilities have their place, the former would of course provide the simplest construction of the sensor probe itself.

In the embodiment of FIG. 1, the light signals received by the diode arrays 21 and 22 are fed directly to the readout unit 35. In this case, it is in the 0.1-5 MHz detector to detector range with the scan repeating as many as several times per second. If the probe is fixed in position, this repeating scan will of course be the same signal and this allows for utmost accuracy in transmission and decoding build-up of the signal over a period of multiple cycles which is a very effective way of creating high signal to noise ratios. This is not to say that the sensor probe cannot also measure "on the fly" i.e. with continuous relative motion between the workpiece part and the sensor probe since the diode laser light source can be pulsed to freeze the position of the spots even though the sensor probe itself continues to move.

It will be noted that the sensor probe, being all optical and having a high resolution is considerably faster and more effective than a point contact probe which has been used heretofore for dimensional measurement. The need for speed in such an inspection procedure is paramount because while such an inspection process is proceeding, the machine is not working on a workpiece part, and therefore during the inspection the base, the slides, etc., of the tool machine are sitting idle. Hence, if the inspection is not carried out rapidly, the advantage of combining the inspecting means with the tool machine is lost or at least minimized; and in that case it might be just as well to locate the sensor probe at a different location from the tool machine.

In addition, the foregoing comments are reinforced by the further possibility of the optical sensor probe to sense as well for part defect or surface condition, throughness of holes and the like. Such additional sensing can be accomplished with the same or different probes.

It will be understood that the other possibility of including signal processing means within the sensor probe is quite possible, especially considering the current state of the art of high density circuitry. However, this could require a rather sophisticated processor within the sensor probe using a microcomputer. In this case the signal transmitted could be a highly variant frequency depending on the answer and this would decrease the transmission difficulties.

Figure 2A:
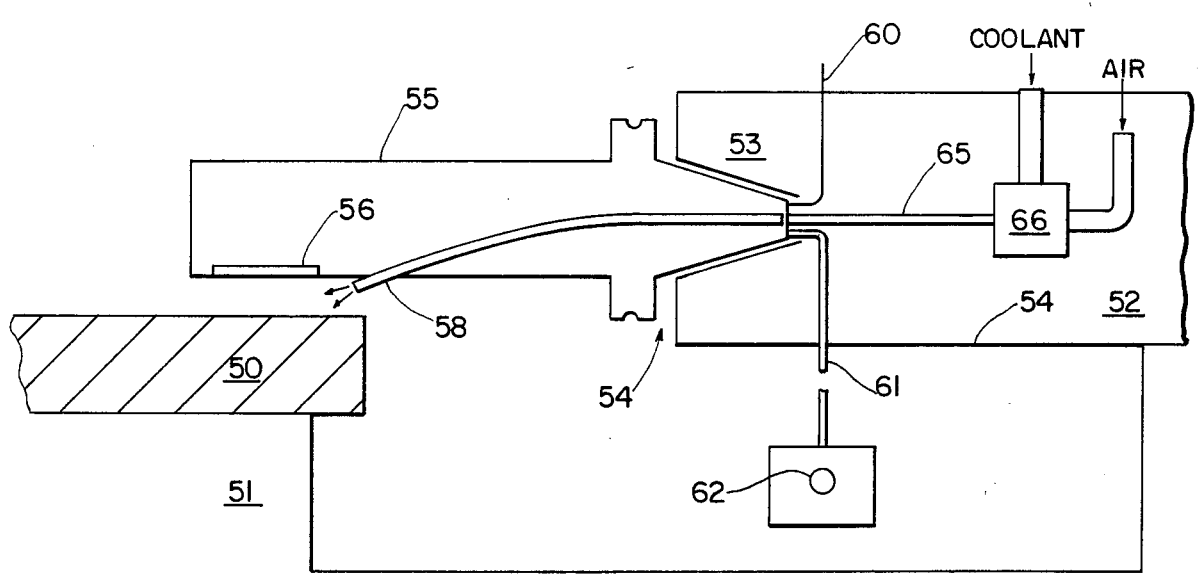
FIG. 2A is a diagrammatic drawing illustrating a second embodiment of the present invention.

FIG. 2A illustrates another embodiment of the invention wherein the sensor probe is physically coupled to the tool machine (and thus requires special spindles, tool holders, etc.). In this embodiment the use of radio telemetry is not required; and in addition power and light can be supplied through lines contacting the probe so that neither a battery nor a light source (if necessary) in the sensor probe is required.

Another advantageous feature of FIG. 2A is that it allows air to be delivered directly into the sensor probe through lines normally used to deliver coolant to a tool, said air being used to clear the area of the workpiece part to be observed by the sensor probe. This can be especially desirable in an environment wherein the workpiece part has acquired substantial amount of residue coolant, machine oil, etc. in the area of the surface to be inspected.

In the embodiment of FIG. 2A, a workpiece part 50 is mounted on a base 51 of the tool machine. Also mounted on the tool machine is a spindle head 52 having a tool coupling 54. In this case the tool coupling 54 has attached thereto a specially designed breech block 53 which has electrical lines and fiber optic light paths adapted especially for use with the sensor probe. In this case the sensor probe 55 is simply and removably inserted within the opening in breech block 53, and in that position the electrical means therein coupled with electrical lines 60, the optical paths mate with optic lines 61 and another opening therein for receiving air mates with an air passage 65. At the end of sensor probe 55 a window 56 faces the workpiece part 50. Air, having passed through lines 55 and into the sensor probe passes out the nozzle 58 to clean the workpiece part 50 in the area to be observed.

Fluid through the line 65 is controlled by means of a valve 66.

In the embodiment of FIG. 2A the sensor probe 55 can be any type of electro-optical sensor probe as described in the said pending applications. For example, it may measure the surface finish or the distance of the sensor probe to a side wall. In any event, the sensor probe 55 is removeably inserted into the breech block 53 so that this breech block can serve other types of sensor probes. Moreover, the breech block 53 is connected to the spindle head 52 via the machine manufacturer's coupling 54, thereby permitting a rapid changing of the breech block. A tool machine of this type would normally provide for delivery of coolant through it piped to the tool and in this case that would be the pipe 65.

In mating the sensor probe 55 with the breech block 53 the electrical connections 60 are so arranged to read out the output of the diode array located within the probe. Also within breech block 53 and mated with the probe 55 are fiber optic cables 61. In addition to reading the light signals sensed by the diode array, these fiber optics can be used for delivering light from a light source into the sensor probe, thereby obviating the need for a separate illuminating source within the sensor probe. Moreover, it is within the scope of the present invention to utilize these fiber optics to bring the light back from the image to a diode array located externally instead of within the sensor probe.

In operation, light is directed out to and returns from the surface of workpiece part 50 through the window 56. Adjacent window 56 is in a position to be blow clean by air through nozzle 58. However, the exact arrangement of the nozzle will depend on the type of sensing and the mode of operation. For example, it might be desirable to arrange one or more air flow nozzles at a circumferentially different location than that where the inspection takes place and actually blow the part clean while the spindle is rotating somewhat but still in advance of the inspection point. This will keep dirt off of the window 56.

Sensor probes as used in this case should have substantial light compensating abilities to compensate for degraded window transmission due to coolant mist and other window contaminants. Virtually all diode array systems in the presence of decreased transmission can be so compensated by slowing array scan rate, raising the light intensity or providing a longer array integraion time, or a combination of any or all of the foregoing.

It will be apparent that with the connections coming out sideways at 60 and 61, the rotation of spindle 52 will have to be limited, as otherwise the cables would tend to get crossed. However, it is not likely that rotations of more than 360 degrees would be required in any case.

The above embodiments have shown application of the invention to measurement of part size and surface finish. However, a wide range of other variables can be monitored such as part surface defects and the like. Radio telemetry as well as optical non-contact coupling has been illustrated. Remote coupling such as induction or radio telemetry is in general desirable for rotating members, however, optical is also usable, especially for non-rotating applications, such as tool change applications on NC lathes and robots such as illustrated below. Indeed, in these later type applications, even direct wire connection is also possible (although less desirable due to the connector problem).

Suitable image carrying fibers include Nippon Sheet Glass Company "selfoc" guided wave fibers, or leached glass bundles having 8000 fibers each, 20 microns dia., or for less resolution even plastic fiber bundles such as Dupon Corfon (see also the referenced copending application Ser. No. 173,370 for a complete discussion of such fiber sensors). Suitable diode arrays for measurement and flaw detection include for example the Reticon 1728C linear array and the GE TN2500 matrix array.

It is noted that the fiber optic coupling out of the diode array signals via fiber 61 can be done by converting the diode array output to pulse or frequency code as mentioned above which is all digital and therefore desirable. In addition, no physical contact with the probe is required.

Figure 2B:
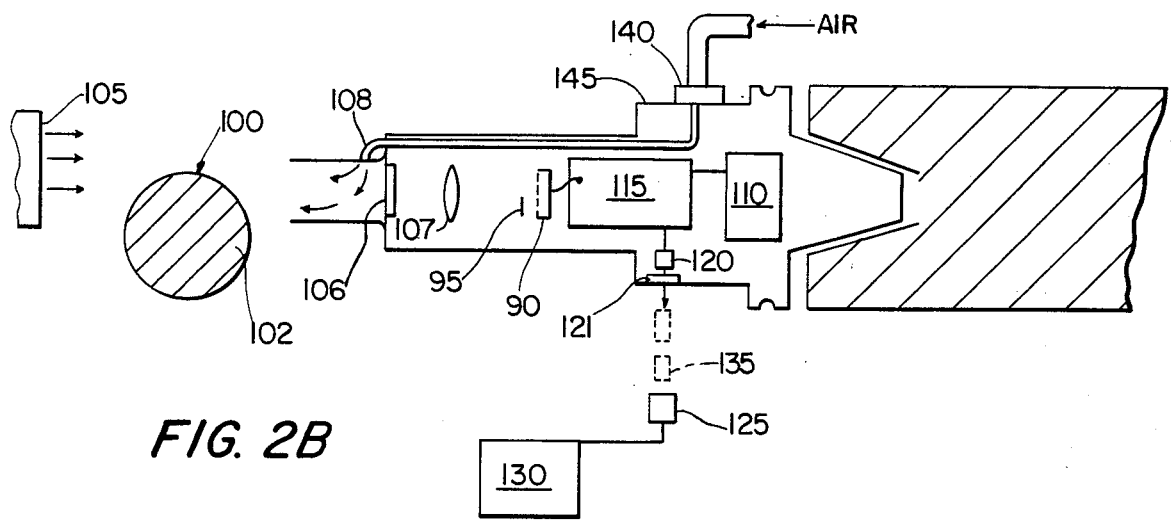
FIG. 2B is a diagrammatic view of an alternative arrangement of FIG. 2A.

For example, as shown in FIG. 2B. A similar system however not requiring any physical connection to the probe (as in FIG. 1) can be provided. In this case, diode array 90 reading whatever variable is of interest for example in this case, the image 95 of the edge position 100 of cylindrical object 102 back illuminated by an external light source 105. Window 106 separates lens 107 from the outside.

Battery source 110 powers diode array 90 and circuit 115 which converts the diode array scan to an output light signal from LED, 120. This light signal exits window 121 and is directly picked up by detector 125 connected to readout 130. Alternatively optical fibers such as 135 (dotted lines) can be used to transmit light from the LED to the output window or to collect the light and convey it to detector 125.

Detector 125 can exist at one circumferential location, or up to 360° in any annular form about the outside of the probe. In this latter state, it can pick up signals through up to 360° of probe rotation. Conversely a single point detector can be used and and up to 360° emitting light source such as a circumferential ring of LEDs 120 can be used to achieve rotational readings.

Compressed air blow coupling is also essentially non contact via manifold 140 located around the probe tool flange 145. This manifold can be at one point or up to all the way around to allow probe rotation with air at all locations. As described, air can be routed to blow off the part to be measured, to keep the sensor window such as 106 clean (as shown through nozzle 108) and/or to keep the data output window 121 clean.

Circuit 115, the diode array and LED, typically runs off very little current and voltage and typically causes very little battery drain. It is also within the purview of the invention however to have a second system communicating to the probe to turn this circuit on and off as required. This can easily be provided in the FIG. 2B example by simply using the presence of background light from source 105 to turn it on. No light would normally hit the sensor unless it was loaded in the machine.

Circuit 115, in its communication to readout 130 can use many forms. In the first instance, the diode to diode output signal pulses can be directly transmitted (typically at 0.1–5 MHz rates) in other words, the light output of the LED 120 is either detector-by-detector pulsed or the detectors are sampled and held and the sampled and held voltages are sequentially fed to the LED and recovered in turn by detector 125.

The above circuit approach does no processing in the probe. The other approach is to utilize the circuit 115 to for example determine the edge image position itself (using techniques shown in copending applications such as Ser. No. 163,290). In this case, a digital number corresponding to the position (eg. detector number 1321 in a 1728 element array) can be transmitted, using any common technique such as frequency or pulse code etc.

A third and last approach occurs when no diode array is used, but an analog light detector. In this case, one can just transmit the analog light signal. For example, in a surface measurement case like FIG. 2, according to copending application reference 7, two such detectors can each have their signals so transmitted. However, because of dirty window conditions it is generally better to pulse a code or frequency code even the analog signals, rather than transmitting them directly via fiber for example (as in FIG. 3).

It should be noted that the diode array 90 shown is normally a linear array. However, it can be a matrix array also capable of scanning in the direction out of the plane of the drawing. This allows the sensor probe to give a two dimensional view of the part, for example, the location of the center of a hole. It is further noted that reflected rather than transmitted light can be used as well, with light source integral or external to the probe.

Figure 3:
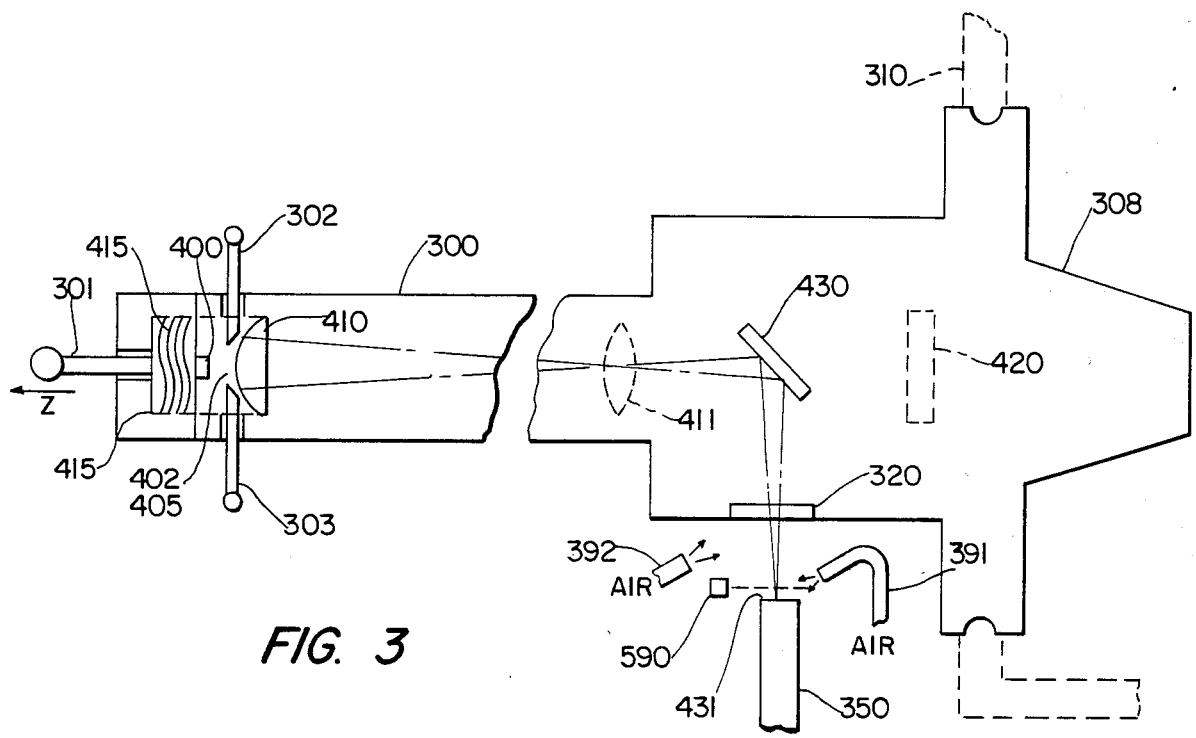
FIG. 3 is a diagrammatic drawing illustrating a third embodiment of the present invention.
Figure 3C:
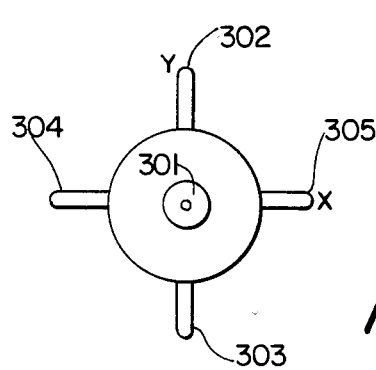
FIG. 3C is a diagrammatic front view of a portion of the device of FIG. 3.

FIG. 3 illustrates a novel embodiment utilizing a variant of the contact optical probe shown in a recent copending application combined with the CMM probe of Ser. No. 201,081. Non-contact fiber coupling is illustrated.

In this case, a probe body 300 contains 5 contacts 301–303 plus two out of the plane of the paper 304 and 305. Connection is via a morse taper portion 308 commonly used in machine tools, and the probe is loaded by tool changer arm 310 (dotted lines) into the tapered chuck of the machine.

Since most machines have keyed (ie. circumferentially oriented) chucking, it is possible to load the probe with the output window 320 opposite the readout, which in this case, is remoted by fiber optic bundle 350 and includes crossed diode arrays 360 and 370 and lens 380 to focus the image of the bundle end 355 on the arrays. A single crossed array chip can be used if available, otherwise a matrix array or 2 linear arrays and a beam splitter or even one single array can be used (if tapered inner edge members such as 302–305 are used).

While the chuck is rotatable, the probe clearly must be stationary to utilize the coupling shown. The 4 circumferential probe points generally make rotation not required, however (although the probe can be rotated until alignment is reached if keying is not possible). Alternatively, one can use a single probe such as 302, and multiple fiber optic image conduits arranged circumferentially (eg. 351 dotted lines) to allow measurement at multiple circumferential orientations.

The probe shown has many advantages over conventional "touch trigger" probes such as the "Renishaw" probe. Primarily, the advantages are extremely high accuracy and an actual measuring capability provided by the diode array. This provides a contouring capability not possible with touch probes plus an electronic zero.

Insofar as points 302–305 are concerned, operation is similar to one of the copending application references. LED or other light source 400 illuminates the inner edges of spring loaded contact pins 302–305, located 90° to each other. Lens 410 provides an image of these pins onto either an integral diode array or arrays 420 (dotted lines) located in the probe and radio coupled or, as in this case, onto an external array 360/370 via mirror 430 through window 320 onto the face 431 of fiber imaging bundle 350. An auxilliary lens (or lenses) such as 411 may also be employed which may be internal or external to the probe.

Figure 3A:
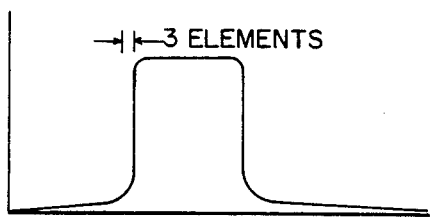
FIGS. 3A and 3B are diagrammatic graphical representations of output signals from the embodiment of FIG. 3.
Figure 3B:
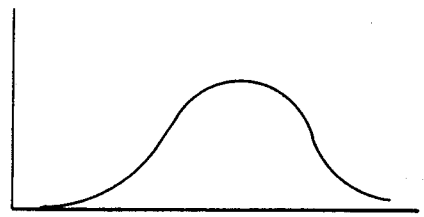

The axial or 2 axis contact point 301 can be built to provide an edge image transduction as well, via a right angle mirror or prism for example. However, in the version shown, this contact is connected (via arms 415, dotted lines) to lens 410 such that axial movement of the contact moves the lens and defocusses the edge image of contacts 302–305 (see FIGS. 3A and 3B). This defocussing can be used as a touch sensor, for example triggering a 2 axis position measurement of the machine tool axis when 10 array elements (rather than the normal 2–3) are included in the edge image (see FIGS. 3A and 3B). Alternatively the degree of defocus can actually be monitored to provide a measurement of contact 301 position, and too, the array or a lens in the system such as 411 can be physically moved and the amount of movement required to refocus gives an indication of contact movement.

While illustrated relative to contact probes, this same fiber coupling arrangement can be used in many other cases. As well, such as triangulation example of FIG. 1, surface finish, flaw detection and the like.

Figure 4A:
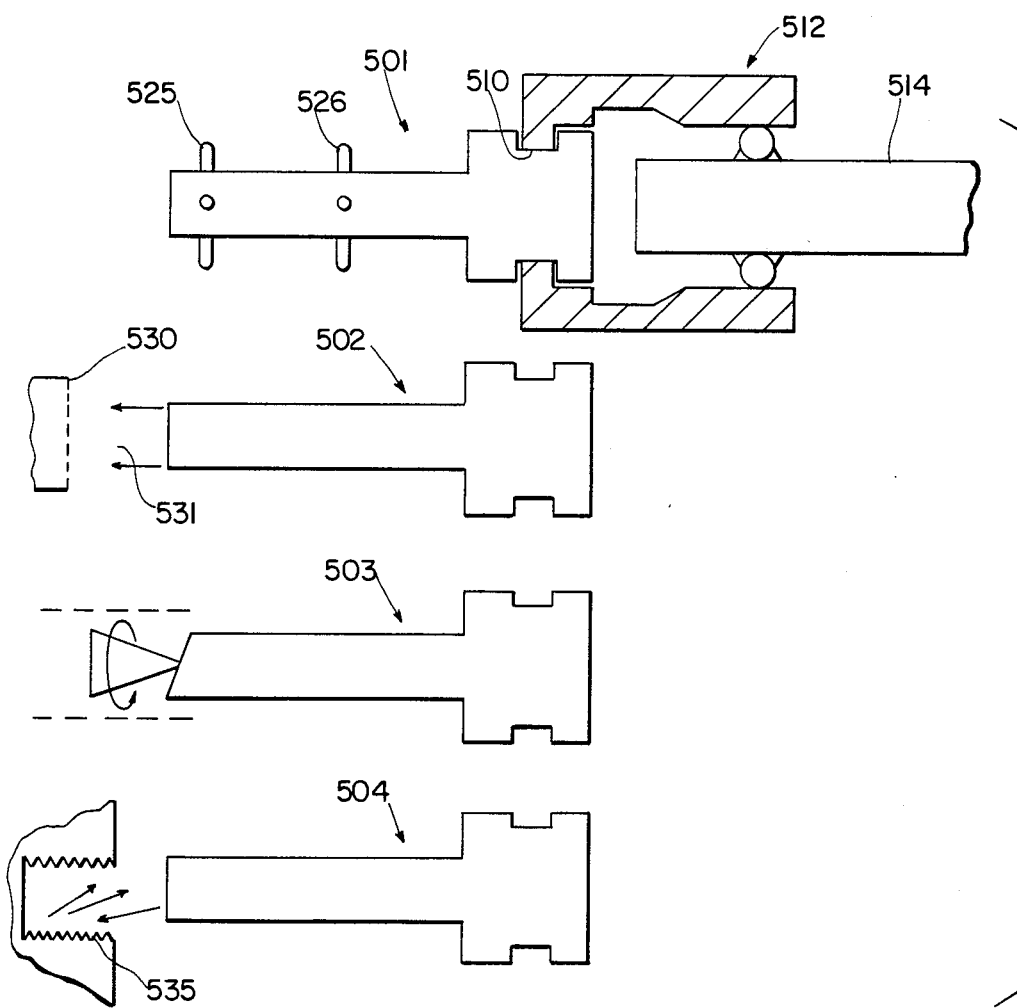
FIG. 4A is a diagrammatic drawing illustrating a fourth embodiment of the present invention.

FIG. 4A illustrates another embodiment in this case involving a robotic based sensor change operation. A group of inspection probes 501–504 are illustrated, capable, respectively, of monitoring bore dimensions, surface defects, or edge locations, both defects and thread conditions, for example, all via optical means (discussed in copending applications). Each probe has a locating surface such as 510, where a robot gripper 512 can grab it (alternatively morse tapers as in FIGS. 1–3 or other means may be used). The probes are typically located in a holder (not shown), to allow the robot to repeatively find, grap and replace each in its proper location, such holders can be linear rotary or any other suitable arrangements.

The idea of this arrangement is two fold. First each of these probes, like the previous can be used in machines augmenting the normal machining cutters presently used therein. This applies whether in tool change or turret form. In this case, the robot 514 is simply the tool changing mechanism of the machine or a separate mechanism used just to change the sensors disclosed.

It is of interest, however, to consider the use of the robot to provide the actual part inspection, as shown in FIG. 4B. In this case, the robot actually is used to move the sensor to different points on the part independent of the machine tool or other production machine. A sensor unit is used to check all applicable features and then replaced in the holder, and a new sensor grabbed.

Consider FIG. 4B. The robot 600 can selectively pick up probes 601 according to the invention from holder or turret 610. As shown, it has already picked up a contact probe 615 to determine bore diameter of bore 620 in transmission case 625 on pallet 630. This pallet can be rotated by motor 635 to allow presentation of other faces of part 625 to the robot.

After all bores possible have been checked with probe 615, the robot can in one desirable version go back and pick up a bore probe for other larger bore sizes and, under control of computer 640, check those. After all larger bores have been checked, the robot is then programmed to pick up contouring probes, bore or face defect probes, surface finish probes or any other probes according to the invention in order to complete the desired inspection of the part.

Let us now consider further the probes shown in 4A. Four types are shown, an 8 point contact optical version, 501 having 2 sets of contacts 525 and 526, each set containing 4 contacts so as to check bore size, taper, and roundness (ovality). Probe 502 is a diode array based flaw detection unit for looking at a surface such as 530 (dotted lines) with an integral light source projecting light 531 onto the surface, and lens means (not shown) for imaging light onto the diode array, possibly with fiber optic transmission. While not shown in this figure, the triangulation probe of FIG. 1 and in some cases the surface finish probe of FIG. 2 can also be operated in this manner.

Probe 503 is a bore flaw probe such as the invention of our copending application and probe 504 is a thread sensing probe also shown in said application used for inspecting threads such as 535 shown.

Each of these probes can be constructed in any suitable manner. However, FIG. 4C illustrates construction such that each sensor of whatever type utilizes a common diode array 647 and/or light source unit 670 carried by the robot or machine (not shown). This allows each sensor probe such as 655 to be reduced to the simplest portion, with the expensive electronic item (array, circuits, light source etc.) to be shared amongst all with light passing between the individual sensor 655 and robot via windows such as 653 and 654 shown.

A taper locator arrangement 656 is illustrated in this case to further define the probe axis. Each probe is set up, in the case shown to cause an image, diffraction pattern or other light pattern to fall on the detector array, with proper focus achieved by the good mechanical fixturing of the taper connection. Alternatively, a lens 660 (dotted lines) may be incorporated in the base unit 650 such that the image such as that of surface 661 is provided therewith (possibly with the help of auxilliary lenses in the probes). Light source unit 670 could be external, as in FIG. 2, in the probe and battery powered as in FIG. 1, or provided as shown wherein it too is shared amongst all probes. Even multiple sources can be so provided via beam splitters or the like. The light may also be directed down the same axis as the imaging.

While shown provided in a "tool change" mode this same arrangement can be in a rotary or other turret, ideally using probes like those of FIG. 4A which do not require an in/out motion to seat (as does a taper). This whole turret assembly can be carried by the robot, or parts brought by the robot to the turret assembly (naturally this is best done when the parts are smaller than the case shown, ie. where it is more convenient to bring the part to the gage than visa versa).

On lathes having turret mounts the sensors above can be carried in the turret just as any other tool. A common readout as just described in FIG. 4C can be used, however, likely remoted with fiber image arrangement as in FIG. 3.

It is noted that the size probes shown can be used to check the part after semi-finish cuts to see what the final tool position should be for final cut. When machining rough forgings or castings, these probes (particularly the non-contact ones), can quickly and accurately scan the part to determine location and other part feature positions relative to the machine. Machine axes controls can be computer rotated on multi axis machines to account for misaligned parts as well.

It is further noted that besides air to blow-off the various optical windows utilized in this invention, coolant flow itself may be used, if uniformally distributed so as not to unduly disturb the optical signal. This can be desirable as virtually all machine tools have provision for coolant but may not easily be implemented with air. Also shutters can be used opening only when readings are necessary, such as 590 on FIG. 3. Note too in FIG. 3 that air blows 391 and 392 can also be employed to keep window 320 and fiber end (or window) 431 clean too.

Shown in FIGS. 4D and E are turrets as mentioned above. FIG. 4D shows a turret in which the probes 680, 681, 682 and 683 are located on dial 684 driven by motor 685 rotating about axis 686. At each rotation of 90° a new probe of the type shown is brought in front of detector array 687 of fixed sensor unit 688 itself. Collimated light source 689 is utilized to project light to each sensor via beam splitter 690. Any convenient number of probes may be used, not just 4 as shown.

FIG. 4F illustrates another arrangement using a dial 691 90° rotated from dial 684 axis 686. In this case, 4 probes 692-695 are shown, which like the probe above can be any of the types disclosed. In this case, however, the fixed sensor unit employs a Vidicon image detector 696 and common lens 697 to scan images of each signal obtained from the sensor probes, whereas in 4D, each probe has its own lens for working in conjunction with diiode array 687. Detector arrays are generally preferable to analog image detectors such as Vidicons but any suitable means for scanning the image may be used.

Sensors of FIG. 4F have purposely been illustrated in different lengths, diameters and types since this is the general case, and the invention is not restricted to like type probes in any set.

The robotic sensor positioning unit of FIG. 4 can be used to check the tooling of the machine tool as well as the part produced. This check can be done either while the tooling is on the machine spindle, or after loading into a tool changer.

Figure 4G:
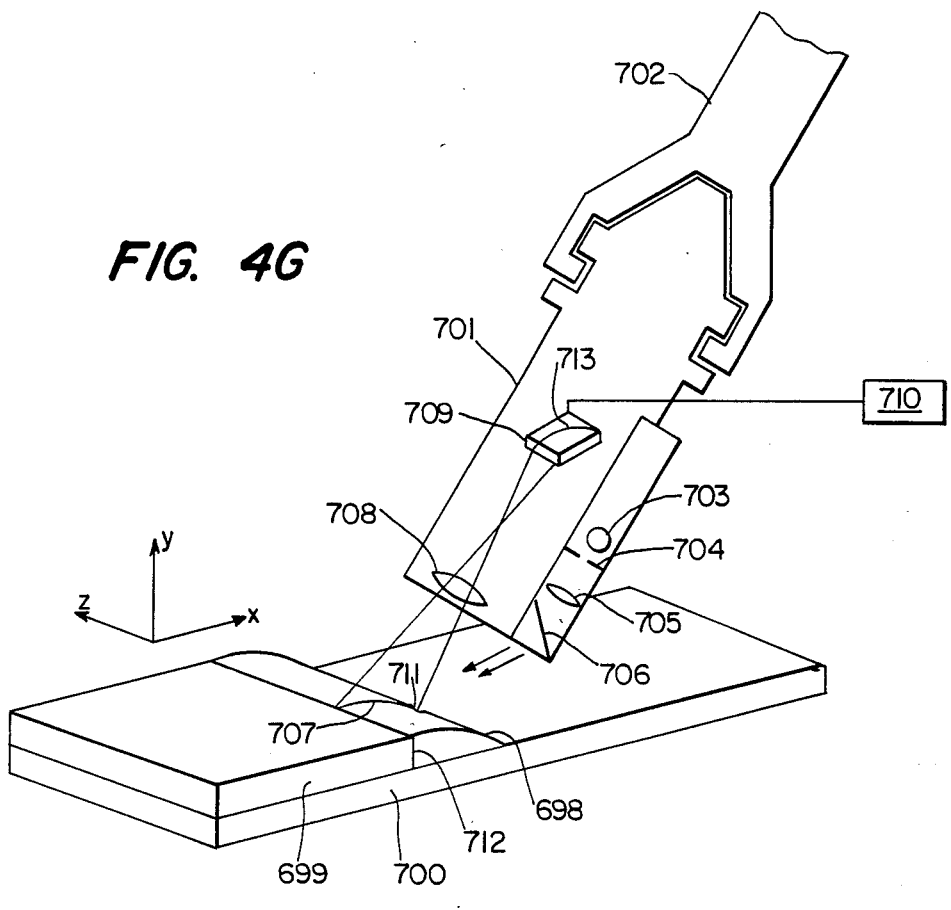
FIG. 4G is a diagrammatic perspective view of a weld inspection embodiment.
Figure 4H:
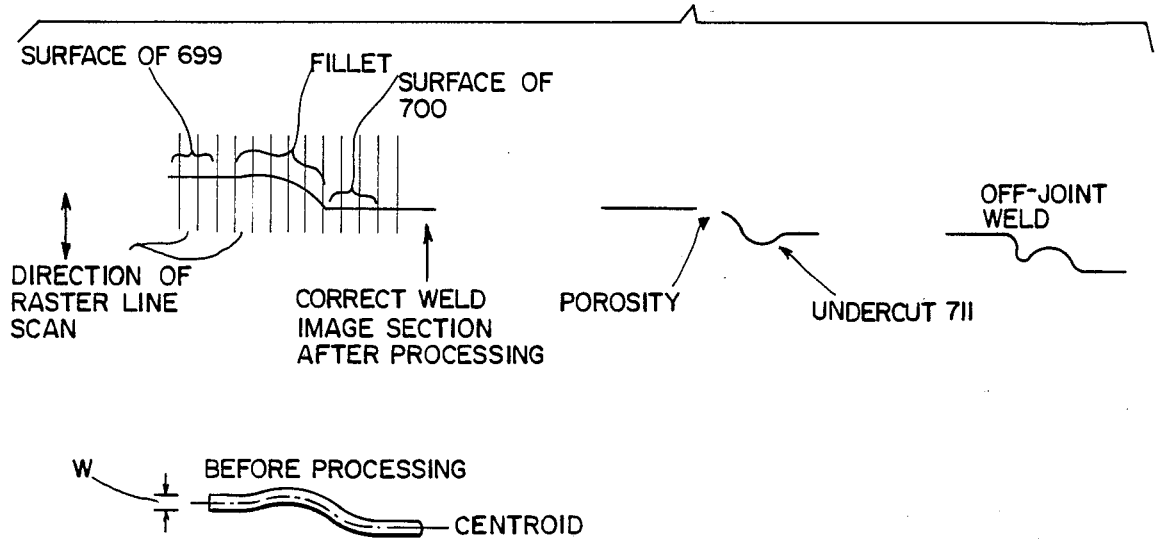
FIG. 4H is a diagrammatic graphical representation of output signals from the device of FIG. 4G.

FIG. 4G shows an automatic weld inspection sensor according to the invention. Flat parts 699 and 700 are joined by arc type fillet weld 698, and are to be inspected by sensor 701 carried by robot 702. The weld is to be inspected for any or all of the following variables: presence, location (in the x direction relative to the joint 712), porosity (excessive holes), undercuts (non-fill-in) in base metal part 700, correct fillet shape, and completeness along the joint in the z direction as shown in FIG. 4H.

The sensor obtains contour data at multiple sections in the z direction which are compared to correct profiles via programs stored in microcomputer 710.

Function is triangulation based similar to FIG. 1, but in 2 dimensions. A light source, in this case a linear flash lamp 703, is projected through slit 704 which is projected and focused to a line 707 on the part by lens 705 via prism 706. Lens 708 forms an image 713 of the projected line 707 on the part onto matrix photodetector array or other image detector 709. The projection direction and axis of lens 708 form an angle with each other such that contour sections are produced. An undercut, 711 appears as a small purterbation in the otherwise smooth contour of the weld zone.

The sensor transmits the image 713 to microcomputer 710 and after so doing the robot moves the sensor to a new z location on the weld and so on until all sections desired have been obtained. Alternatively the sensor can be fixed and the part moved past it (for example, via the robot). Typical sections are 0.1" wide in the z direction. Thus 10 are required for 100% coverage of a 1" long weld.

Alternatively, the total weld length can be viewed simultaneously if a grille of parallel lines spaced in the z direction is projected, ie. by replacing slit 705 by a grille. In this case, lens 708 must image each line at lower magnification onto the array 709. This lower magnification can be a disadvantage in some cases and rotating mirror systems (not shown) can be used to sweep both the projection axis and/or the image axis in z direction.

Figure 5:
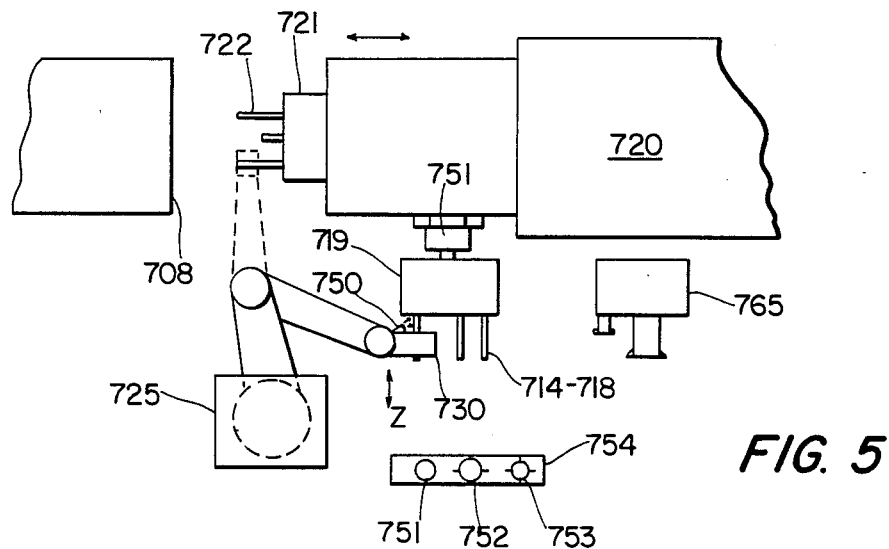
Figure 5A:
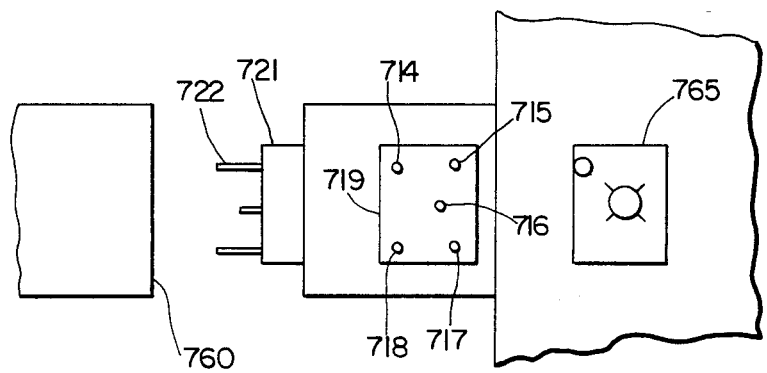
FIG. 5A is a diagrammatic drawing illustrating a fifth embodiment of the present invention.
Figure 5B:
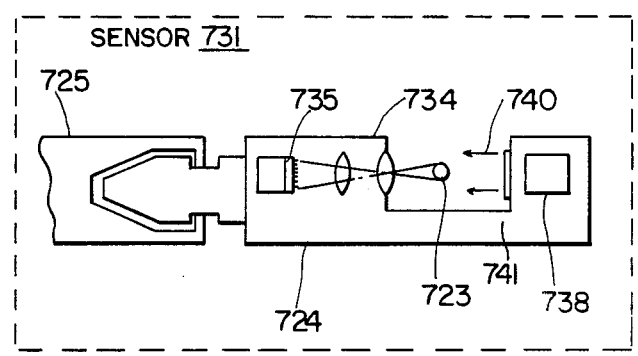

Shown in FIG. 5 is an application to checking tooling and/or parts on a head changer machine. These machines have multiple tools such as 714-718 (usually drills or taps) on a common geared drive head 719 which is located in to the machine as a completed head in order to machine one face 708 of a part, such as transmission case pan rail).

As shown in FIG. 5, the head 719 is located on the head changer machine and contains five drills 714-718. These are to be inspected for correct length, and the presence of chips out of the drill and tip curvature changes which would indicate wear. As shown, the head is in the side position on the machine 720 and is the next head to be loaded. Other heads such as milling head 765 are in storage. Another head 721 with tools 722 is shown in the machining position. The robot, 725, which may indeed be the same as that used to inspect the part, but also may be a different one specially for the purpose of inpsecting tooling, is positioned as shown in the top view so as to bring the sensor 730 near to the first tool, drill 718. In this particular case, a diode array matrix sensor head such as 731 (5B inset) is used which can image the whole end of the tool at once. However as shown in the inset, it can only provide a high magnification image of one axial (via lens system 734) portion of one tool (eg. 718) at a time, onto matrix array 735 and therefore must be physically moved from one tool to the next and positioned so as to view the drill in the inspection zone desired. After inspection it is moved down the drill (z direction shown) and then to the next tool or return to have to pick up another sensor head.

This is easily accomplished using the multi-jointed robot arm which is shown in the figure positioned to inspect that tool. While lighting 740 could be from an external source, in this case it is with the source 738 carried with the sensor itself. This same backlighting technique could be used with any of the sensors in FIG. 4 as well.

Source 738 is connected to the array and lens portion in this case by a 'C' frame 741 which must be moved around the tooling. However, since the tool's positions are known to the computer controlling the machine and the robot, there is no problem trying to move around the tooling, assuming sufficient degrees of freedom in the movement. This is particularly true if sensors according to the invention are also used to guard against crashes by looking at the tools as they move in. This is particularly discussed in one of the copending applications concerning fiber robot sensors.

Figure 5C:
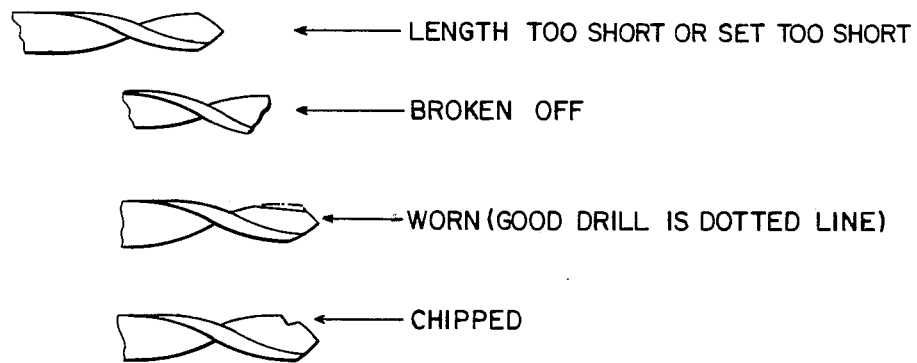

Inspecting the tooling just before it is loaded, guards against loading bad tooling and, in addition, does not use up cycle time associated with the machining itself. There are two alternatives, however. One is to look at the tools that have just been removed. In this case, the head just removed might contain a tool whose tip was broken and in fact various cases of either correct length tool, broken tip drill and chipped drill and worn drills are all shown in the inset attached of FIG. 5C. If one of these cases was present, a signal could be made to the operator to come and replace this tool before it would be called up again by the machine. This is then an advantage to checking just before loading where a shut-down would stop the machining cycle since tool change would take too long. Ideally, the tool should be checked before loading as well in case the operator might have inserted a tool but not set it to the correct length thereby drilling a too shallow or too deep hole. Note that views of drill in FIG. 5C represent one profile only. Two or more views at different rotational positions may be required to fully characterize the drill condition.

Air blow-offs are often required here as well. In this case, one is shown, 750, located at the end of the tooling arm of the robot (or on the end of 730) blowing off the drill before or as the 'C' frame sensor assembly is placed around it. Part pre clean can also be accomplished with a vacuum and/or wiper. In any case, the robot positioner is perfect for executing the procedure.

It is entirely within the purview of the invention to utilize additional sensor heads such as 751–753 in bank 754 such as shown in FIG. 4 to also inspect the tools. It is very likely that drills and taps for example, used on change tooling can most generally be checked by the single sensor head as shown. However, others can be utilized as needed.

It is also noted that robot 725 can swing over (dotted lines) and check tooling 722 on the head mounted for machining, or inspect the part face 760 itself using sensor heads according to the invention as described relative to FIG. 4.

It is, for example, of interest to consider that inspection of head change tooling that had other types of cutters might use some of the contact type sensing as has been shown previously. Another possibility is the fact that if high magnification is used to check one of the ends of the tool, that the robot would move the sensor unit down the length of the tool as in the 'Z' direction shown in the diagram to take successive shots along the tool length. This is true particularly again in taps and drills which require high magnification in the diametral axis but have a long length. In the case of milling cutters for face mills or boring tools, the cutter is generally very short and can be inspected in one shot.

To aid in the inspection of any of these tools, it is desirable to have a capability of rotating the tooling. This is not normally provided in stations such that of head 719 which are not doing any machining. It is thus part of this invention to provide an additional station on the machine which can rotate the tools by simply engaging the drive on the head. Such an auxilliary motor drive is shown as 750 in FIG. 5.

It is also within the perview of this invention to have the heads located in any kind of fashion, for example, moving on a continuous chain on a horizontal track. In short, coupling the descriptions of both FIG. 5 and FIG. 4, one can see that one can check virtually any kind of tooling and any kind of part situation by having the programmable changeable sensor robot unit as shown in this invention. Totally disclosed herein, therefore, are the means of providing all key features—the interchangeable sensor tooling or turret, the moveable sensor position etc. It is likely that all parts would be controlled from the machine tool main control computer in which the data as to the tool and part configuration is stored.

Just as the equipment above is useful on a single point machine tool or a head changing type of tool, it can also be used on transfer machines in which the same fixed tooling is utilized for each part. These are machines in which there is no flexibility and to some degree not all the advantages of the invention are brought to bear in these cases. However, there are still applications.

For example, a transfer machining line typically has a single nest of tools just like one of the heads in the FIG. 5 above at any one station which bores the same face of a part over each time. Generally, these tools can be boring tools, mills and of course drills and taps for example. While these machines are often crowded because there are two sets of machines, one on each side of the part working on it, it is considered feasible to have a robotic inspector of the type shown in FIG. 5 mounted to one side or overhead of the line, inspecting either the part, the tooling, or both just as in the case above.

In such transfer lines, the cycle time is traditionally quite short, typically on the order of 30 seconds. In this case, it is not possible to change the sensor tooling as in FIG. 4 more than let us say once within any given inspection sequence. However, the robotic approach above can be used to inspect various tools or portions of a part on successive cycles. In other words, not all inspections are performed each cycle but statistically a very large sample size is taken in order to insure that very little "junk" would ever be made.

Figure 6:
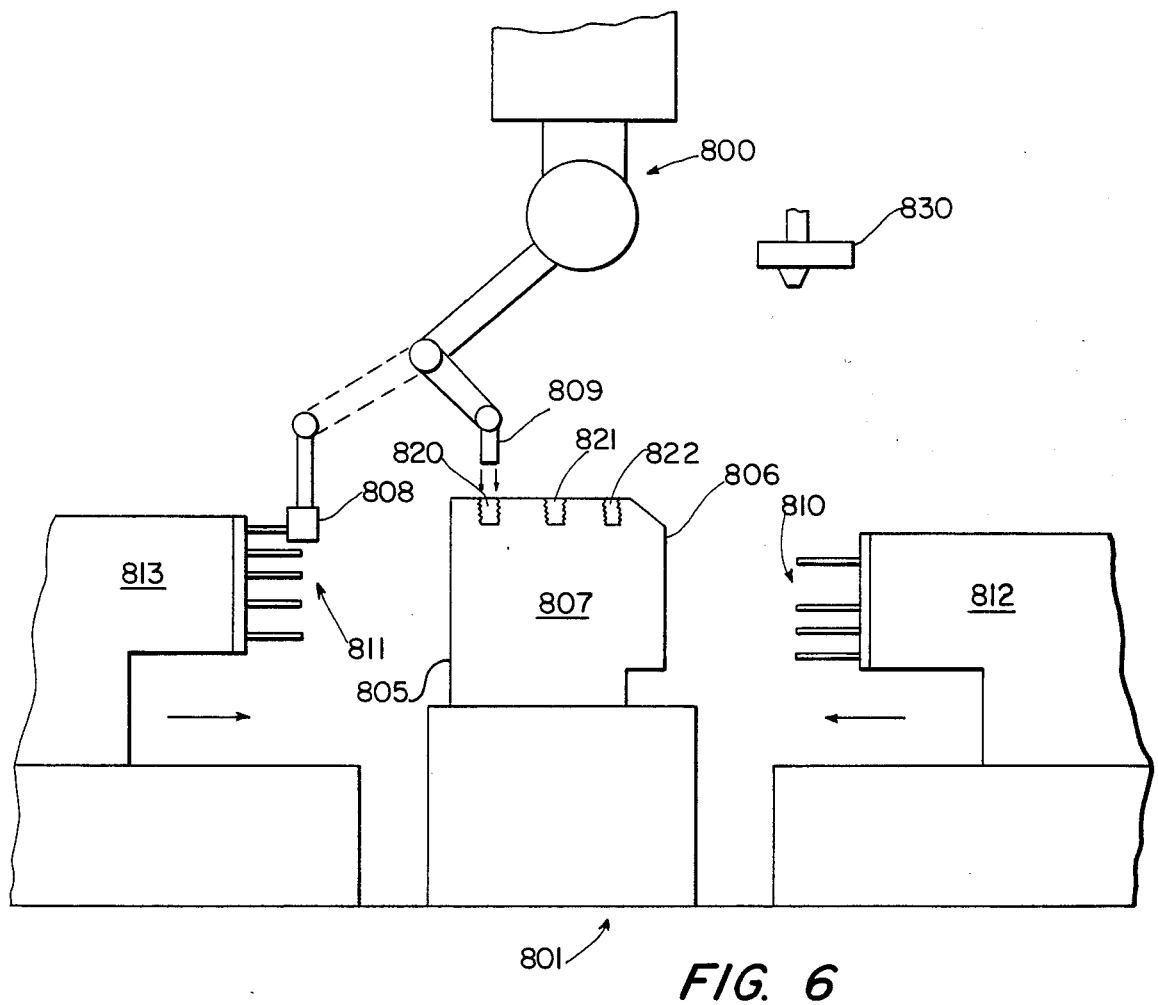
FIG. 6 is a diagrammatic drawing illustrating a sixth embodiment of the present invention.

Consider FIG. 6 which shows a robot inspector 800 of the type shown mounted overhead on a transfer type machining line 801. At this particular station of the line, the faces 805, 806 of a transmission case 807 are being drilled on both sides by drills 810 and 811 on heads 812 and 813. No work is going on overhead but the top face has been drilled and tapped at a previous station.

It is the job of the robotic inspector shown under programmable control to inspect the drills in the groupings 810 and 811 and the tapped holes 820, 821 and 822 made on the previous pass on the top. For this it utilizes two types of sensor units which may be mounted on a common head and interchanged as in a turret (eg. FIG. 5), or used in a tool change mode as shown in FIG. 4 above. Assuming the latter, it is shown that a grouping 830 of sensor tooling is mounted overhead where they can be picked up by the robot between inspections. As the part is brought into position, a thread sensor like that shown in FIG. 4 is pointed by the robot down all of the holes on the top face which it is possible to get to within the machining sequence cycle time. On the next pass, the robot would then finish the job looking at the rest of the holes on the top. It then goes, in this particular example, and changes the sensor tooling to get a sensor such as 731 for drill condition and goes back over to each of the drills in succession, generally taking at least two cycles per side.

It is clear that many other inspection rationales can be made for this system which would lend themselves to in-line inspection. The use of more than one robotic inspection unit per station is possible with each of the robotic inspection units for example sharing the same set of sensor change tooling etc. This of course is also quite feasible for more rapid inspection even on single point or head changing machines as well.

Another use of the probe shown in FIG. 4, is to datum the machine. In other words, when the probe is located onto the machine tool spindle, it can be used as part of the machine to datum the machine against a fixed stop. Alternatively a probe can be located at some point on the machine and the machine tool spindle with its tooling such as a drill or milling machine brought over to the probe.

Naturally because the optical sensor can sense much more than just one point on the tool, a complete checkout of the machine can be possible in this manner.

Also illustrated in FIG. 4B is the use of a second robot 900 shown on dotted lines to position a light source 901 (also in dotted lines) which also can be interchangeable on the opposite side of a lube hole 910 from the sensing unit robot 600. Under programmable control, both the light and the appropriate sensing unit (such as 502) can be moved by their respective robots to inspect all the through holes in the part. This is extremely useful for determining blockage in transmission and other lube holes which, if blocked, can cause warranty failures. The use of the robot light and sensor positioning allows a thorough check of the holes to be made. This also works even if the holes are not straight through but where the light injected by light source must travel as in 910 down a bouncing path to reach the detector.

It should be noted that the weld inspection of FIG. 4G can also be built in a single point triangulation mode similar to the sensor in FIG. 1. In this case, a light spot at the instantaneous measurement point is mechanically tracked across the weld section. This can take two forms. Either the spot and image detector, typically a linear array can be moved in unison across the weld fillet section, or the spot can be scanned and the detector stationary. In the latter case, the spot can be scanned by moving the light source physically, or by moving mirrors to direct the spot at different points on the weld. Similarly the moving spot can be tracked by a second moving mirror unit so as to remain on the detector.

The weld data obtained can be analyzed in many ways as shown in FIG. 4H. In one example, the raw image of strip width W is processed to get the centroid of the image which is then justified by the computer to lie essentially parallel to the image of the surfaces of parts 700 and 699. Then the individual contours are compared to correct values. If correspondence within certain limits is not reached as in the examples shown, the weld is rejected.

The image is scanned raster fashion across the weld section as shown in FIG. 4H. The centroid of light strip is found independent of light energy, which can be wildly variant depending on weld shape and condition, presence of flux etc.

The term light in this application includes not just visible wavelengths, but all electro magnetic wavelengths from x-ray to infra red. Visible and near infra red is however preferred.

The sensor concepts above can also be accomplished using diffraction patterns as described in co-pending applications and granted patents by the inventor. This applies particularly to the optical contact gage such as that of FIG. 3. In this case, the data can be transmitted in spatially modulated form not as an image but as a diffraction pattern.

The part or tool data sensed in the operations can be used to accept or reject parts, but even more importantly may be used to control the machine. This can take many forms. Dimensional variations in parts or tools can be used to compensate tool position, defects in tools can be used to stop the machine, actuate a tool change cycle or the like. Part surface defects can signal that defective costings are present, or that machine settings are incorrect to prevent the finish desired, and corrective action taken. Only with the wide range of electro-optical sensors here disclosed can the complete gamut of variables affecting performance be monitored.

The probes shown in FIGS. 1–6 can be constructed so as to be compatibly loaded from existing tool magazines into existing spindles by changers. Also they can be made for gripping by robotic or other devices. In the latter context, it should be noted that with a suitable gripper design, or interchangeable grippers, a robot can do work such as lifting or welding parts etc., and then come over and grab the sensor tooling according to the invention to inspect the part in question or other parts.

Although the invention has been described in considerable detail with respect to preferred embodiments thereof, it will be apparent that the invention is capable of numerous modifications and variations apparent to those skilled in the art, without departing from the spirit and scope of the invention, as defined in the claims.

What is claimed is:

1. A method of determining a dimension and a surface characteristic of an object comprising:
    providing a machine comprising means for interchangeably positioning sensor members in an operative position on said machine;
    providing a plurality of different sensor members, each sensor member being positionable in said operative position and comprising optical means mounted therein for receiving light from an object or from a contact member in contact with said object and for conveying said light out of said sensor member, said optical means of a first sensor member being constructed and arranged for determining a dimension of an object and said optical means of a second sensor member being constructed and arranged for determining a surface characteristic of an object;

providing an image scanning light detector remote from said sensor for detecting said light conveyed out of said sensor member;

positioning said first sensor member in said operative position on said machine;

directing light onto an object or onto a contact member in contact with an object whereby light from said object or contact member is received by said optical means of said first sensor member and is directed out of said first sensor member and to said remote image scanning light detector;

determining, from light detected by said remote image scanning light detector, a dimension of said object;

positioning said second sensor member in said operative position on said machine;

directing light onto an object or onto a contact member in contact with an object whereby light from said object or contact member is received by said optical means of said second sensor member and is conveyed out of said sensor member and to said image scanning light detector; and determining, from light detected by said image scanning light detector, a surface characteristic of said object.

2. A method according to claim 1 wherein each of said sensor members comprises a window and wherein said light directed out of said sensor member is directed through said window.

3. A method according to claim 1 wherein said light is directed onto said object or contact member from a source located remote from said sensor member.

4. A method according to claim 3 wherein said light is directed from said remote source into each of said sensor members and from each of said sensor members onto said object or contact member.

5. A method according to claim 1 wherein said light is directed into and out of each of said sensor members through fiber optic means.

6. A method according to claim 1 further comprising conveying a cooling or cleaning fluid from a remote source into each of said sensor members and directing said fluid out of each of said sensor members and onto a surface of said object onto which said light is directed.

7. A method according to claim 1 wherein each of said sensor members is rotated.

8. A method according to claim 1 wherein each of said sensor members comprises a contact member mounted therein, said contact member being mounted to contact said object.

9. A method according to claim 1 wherein a robot is utilized to position each of said sensor members in said operative position.

10. A method according to claim 1 wherein said sensor member positioning means comprises a turret.

11. A method according to claim 1 wherein said image scanning light detector comprises a plurality of discrete photodetectors.

12. A method according to claim 1 wherein said photodetectors comprise photodiodes.

13. A method according to claim 1 wherein the light received by said optical means of and directed out of said first and second sensor members comprises a light pattern.

14. A method according to claim 1 which said light directed out of said first and second sensor members is imaged on said image scanning light detector.

15. A method according to claim 1 which each of said first and second sensor members comprises a lens for forming an image of the light received by said optical means.

16. Apparatus for determining a dimension and a surface characteristic of an object comprising;

means for interchangeably positioning a sensor member in an operative position on said apparatus;

a plurality of different sensor members, each sensor member being positionable in said operative position and comprising optical means mounted therein for receiving light from an object or from a contact member in contact with said object and for conveying said light out of said sensor member, said optical means of a first sensor member being constructed and arranged for determining a dimension of an object and said optical means of a second sensor member being constructed and arranged for determining a surface characteristic of an object;

an image light scanning detector remote from said sensor for detecting said light conveyed out of said sensor member;

means for positioning said first sensor member in said operative position;

means for directing light onto an object or onto a contact member in contact with an object whereby light from said object or contact member is directed out of said first sensor member and to said remote image scanning light detector;

means for determining, from light detected by said remote image scanning light detector, a dimension of said object;

means for positioning said second sensor member in said operative position on said machine;

means for directing light onto an object or onto a contact member in contact with an object whereby light from said object or contact member is received by said optical means of said second sensor member and is conveyed out of said second sensor member and to said remote image scanning light detector; and means for determining, from light detected by said image scanning light detector, a surface characteristic of said object.

17. Apparatus according to claim 16 wherein each of said sensor members comprise a window whereby said light directed out of said sensor member is directed through said window.

18. Apparatus according to claim 16 wherein said light directing means comprises a light source located remote from each of said sensor members.

19. Apparatus according to claim 18 wherein said optical means comprises means for receiving light from said remote source and for directing the received light onto said object or contact member.

20. Apparatus according to claim 19 wherein said light is directed into and out of each of said sensor members through fiber optic means.

21. Apparatus according to claim 16 further comprising means for conveying a cooling or cleaning fluid from a remote source into said sensor member in an operative position and for directing said fluid out of said sensor member and onto a surface of said object onto which said light is directed.

22. Apparatus according to claim 16 further comprising means for rotating each of said sensor members in said operative position.

23. Apparatus according to claim 16 wherein each of said sensor members comprises a contact member mounted therein, said contact member being mounted to contact said object.

24. Apparatus according to claim 16 further comprising robot means for positioning said sensor member in said operative position.

25. Apparatus according to claim 16 wherein said sensor member positioning means comprises a turret.

26. Apparatus according to claim 16 wherein said image scanning light detector comprises a plurality of discrete photodetectors.

27. Apparatus according to claim 16 wherein said photodetectors comprise photodiodes.

28. Apparatus according to claim 16 wherein said optical means comprises means for receiving and conveying a pattern of said light.

29. Apparatus according to claim 16 further comprising means for imaging said light on said image scanning light detector.

30. Apparatus according to claim 16 wherein each of said sensor members comprises a lens for forming an image of the light received by said optical means.

* * * * *